(12) United States Patent
Cheng et al.

(10) Patent No.: US 6,393,179 B1
(45) Date of Patent: May 21, 2002

(54) OPTICAL COUPLING SYSTEM

(75) Inventors: Yihao Cheng, Kanata; Gary S. Duck, Nepean, both of (CA)

(73) Assignee: JDS Fitel Inc., Nepean (CA)

( * ) Notice: Subject to any disclaimer, the term of this patent is extended or adjusted under 35 U.S.C. 154(b) by 0 days.

(21) Appl. No.: 09/369,343

(22) Filed: Aug. 6, 1999

Related U.S. Application Data

(63) Continuation-in-part of application No. 09/015,325, filed on Jan. 29, 1998, now Pat. No. 6,014,484, which is a continuation-in-part of application No. 08/942,496, filed on Oct. 2, 1997, which is a continuation-in-part of application No. 08/896,540, filed on Jul. 18, 1997, now Pat. No. 5,850,493.

(51) Int. Cl.$^7$ .................................................. G02B 6/32
(52) U.S. Cl. ....................................................... 385/34
(58) Field of Search ............................. 385/34, 35, 22, 385/33, 15, 16, 20–23, 74

(56) References Cited

U.S. PATENT DOCUMENTS

| | | | | |
|---|---|---|---|---|
| 5,359,683 A | * | 10/1994 | Pan ............................. | 385/22 |
| 6,010,251 A | * | 1/2000 | Koyanagi et al. ............. | 385/93 |
| 6,215,924 B1 | * | 4/2001 | Hulse et al. .................. | 385/34 |

* cited by examiner

*Primary Examiner*—Frank G. Font
*Assistant Examiner*—Tu T. Nguyen
(74) *Attorney, Agent, or Firm*—Neil Teitelbaum

(57) ABSTRACT

An optical filter is disclosed having a pair of GRIN lenses disposed back to back, and having parallel end faces orthogonal to coaxial optical axes. Optical fiber tubes having optical fibers therein are disposed adjacent the GRIN lenses and have their inwardly facing end faces slant polished to lessen the effects of unwanted back reflections. This arrangement wherein optical axes of the optical fiber tubes are not parallel to the optical axes of the GRIN lenses is novel and inventive.

14 Claims, 3 Drawing Sheets

OPTICAL COUPLING SYSTEM

This is a continuation-in-part of U.S. patent application Ser. No. 09/015,325, filed Jan. 29, 1998 now U.S. Pat. No. 6,014,484 which is a continuation-in-pat of U.S. patent application Ser. No. 08/942,496, filed Oct. 2, 1997 which is a continuation in part of U.S. patent application Ser. No. 08/896,540 filed Jul. 18, 1997 now issued as U.S. Pat. No. 5,850,493 dated Dec. 15, 1998.

1. Field of the Invention

This invention relates generally to rod lenses such as graded index (GRIN) lenses and more particularly to the coupling of light from waveguides to one or more lenses.

2. Background of the Invention

It is well known to couple light from one optical fibre to another through a pair of collimating lenses, for example graded index (GRIN) lenses. Furthermore, it is well known to couple light from one optical fibre to another through a single GRIN lens via a reflecting element on or near the end face of the lens. Lenses of this type are produced under the trade name "SELFOC"; the mark is registered in Japan and owned by the Nippon Sheet and Glass Co. Ltd. However, it is less well known, that substantial coupling losses may occur between an input port on a first GRIN lens, or other type of collimating lens and an output port an a second GRIN or other type of collimating lens, when the input and output ports are disposed adjacent the optical axes of the two collimating lenses, and when the distance or gap between the lenses is significant. One aspect of this invention addresses this problem and provides a solution to overcome or substantially reduce this unwanted coupling loss.

Although the detailed description hereafter concerns GRIN lenses, aspects of this invention are also relevant to the use of other types of collimating lenses and should not be limited to graded index lenses.

Substantial coupling losses may occur between an input port on a first GRIN lens and an output port and a second GRIN lens, when the input and output ports are disposed adjacent the optical axes of the two GRIN lenses, and wherein an optical element is disposed between the GRIN lenses wherein the element causes a beam propagating from the input port through the first GRIN lens to be shifted as it traverses the element towards the output port and enters the second lens at an offset to the optical axis of the lens.

As requirements for optical filters become more stringent, in some instances their thicknesses increase substantially. This increase in thickness increases the required gap between a pair of collimating lenses.

Typically, dichroic optical filter based devices are manufactured by disposing one or more filter layers between a pair of substantially quarter pitch GRIN lenses.

It is an object of this invention to overcome this disadvantage wherein a large gap is present between two collimating lenses, thereby causing a beam exiting a first collimating lens to enter a second adjacent collimating lens at a location at least partially shifted from its optical axis.

It is an object of this invention to overcome coupling losses normally associated with fibre to fibre GRIN lens systems wherein thick optical elements are disposed between a pair of GRIN lenses.

And, it is a further object of the invention to overcome coupling losses normally associated when an optical element disposed between a pair of GRIN causes a shift of a beam incident thereon.

Another significant advantage of this invention is that under conditions wherein a gap between lenses is not significantly large, and coupling losses are not of particular concern, cost savings are afforded by obviating the requirement to polish one or more GRIN lenses in an optical arrangement, for example in an optical filter.

Generally, GRIN lenses are polished at both ends with a slant complementing the slant of an adjacent fibre tube end containing optical fibres. Providing complementary slanted end faces between optical fibres and an adjacent lens lessens the effect of unwanted back reflections. In this arrangement a pair of GRIN lenses are disposed back-to-back having for example, a dichroic filter disposed therebetween. The inside faces of the lenses are often not polished with an angle, however outside faces adjacent the slanted end faces of the tube are generally polished with a slant. Typically, the lenses have coaxial longitudinal axes, and longitudinal axes of the optical fibre tubes are also coaxial with the axes of the rod GRIN lenses. This is shown in FIG. 13. Hence, the optical fibres contained within the tubes are typically parallel or in some instances coaxial with the optical axes of the lenses.

This invention provides an optical coupling arrangement wherein one or more GRIN lenses do not require a polished slanted end face adjacent an optical fibre tube. Obviating the requirement to polish the lens or at least an end face thereof, provides significant cost reduction in the manufacture of optical components.

SUMMARY OF THE INVENTION

In accordance with the invention there is provided, an optical coupling system comprising: a first substantially focusing/collimating rod lens having substantially parallel end faces orthogonal to a longitudinal axis;

a second substantially collimating/focusing rod lens having substantially parallel end faces orthogonal to a longitudinal axis;

an optical element disposed between the two rod lenses;

a first optical fibre tube adjacent to and optically coupled with at least one of the rod lenses, the optical fibre tube having a longitudinal axis which is non-parallel to the longitudinal axis of a rod lens adjacent thereto, a line extending along the longitudinal axis of the first optical fibre tube intersecting a line extending along a line extending along the longitudinal axis of the adjacent rod lens at a non-zero angle.

In accordance with the invention there is further provided, an optical coupling system comprising:

a first substantially focusing/collimating rod lens having at least one end face that is substantially orthogonal to a longitudinal axis of the rod lens;

an optical fibre tube adjacent to and optically coupled with the rod lens, the optical fibre tube having a longitudinal axis which is non-parallel to the longitudinal axis of a rod lens such that a line extending along the longitudinal axis of the optical fibre tube intersects a line extending along a line extending along the longitudinal axis of the adjacent rod lens at a non-zero angle.

In accordance with the invention, there is further provided, an optical coupling system comprising two GRIN lenses and two optical fibre tubes, each optical fibre tube having an end of an optical fibre therein, each optical fibre end being optically coupled and adjacent to an end face of a different one of the two GRIN lenses, at least one of the optical fibre tubes having a slanted end face facing one of the-GRIN lenses, the GRIN lens face facing the slanted end face of the tube, being non-slanted and orthogonal to a longitudinal axis of said rod lens.

BRIEF DESCRIPTION OF THE DRAWINGS

Exemplary embodiments of the invention will now be described in conjunction with the drawings, in which:

FIG. 4 is a block diagram of an alternative embodiment of the coupling system in accordance with the invention wherein an input fibre is disposed along the optical axis of the GRIN lens it is optically coupled to.

DETAILED DESCRIPTION

Figure 1:
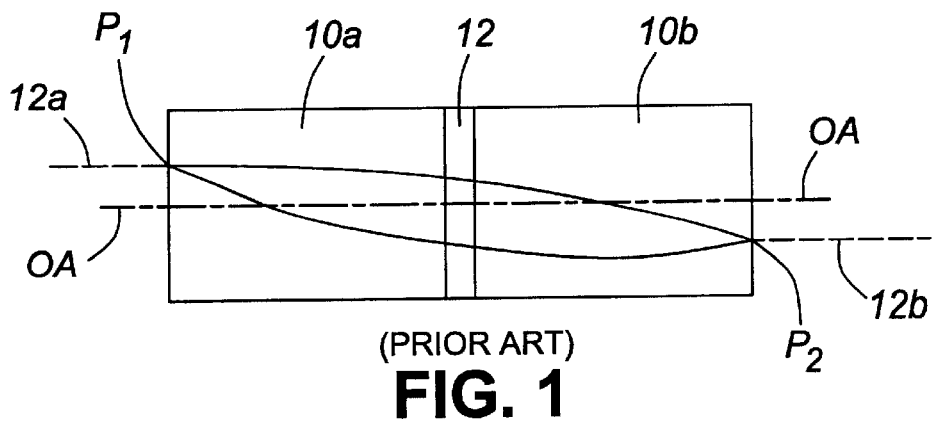
FIG. 1 is a conventional block diagram depicting a typical optical filter having a pair of GRIN lenses and a filtering element disposed therebetween.

Turning now to FIG. 1, a conventional optical filter arrangement is shown, wherein a thin dichroic multilayer optical filter 12 is disposed between a first quarter pitch collimating GRIN lens 10a, and a second quarter pitch GRIN lens 10b. The filter 12 can be coated directly on one of the inwardly facing end faces of the lenses, or alternatively may be coated on a substrate that is antireflection coated and sandwiched between the two GRIN lenses 10a and 10b. It should be noted, that the optical axes of the input/output fibres 12a and 12b are parallel with the optical axes of the two GRIN lenses. Since the beam traversing the lenses 10a and 10b about the filter element 12 is at a location substantially coincident with the optical axes of the GRIN lenses, the light input orthogonal to the end face of the lens 10a at port P1, propagates through the filter 12 and through the second lens 10b and exits as a focused beam that is parallel to the input beam and the optical axes of the lenses 10a and 10b.

Figure 2:
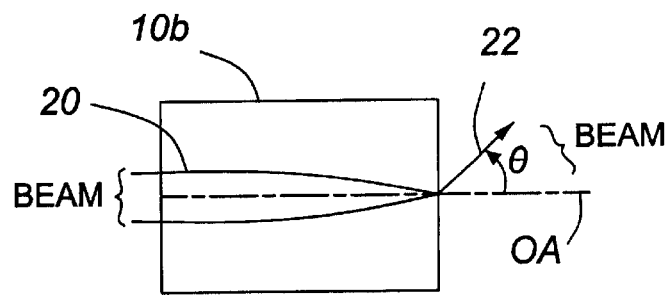
FIG. 2 is a block diagram showing a beam of light as it enters a substantially collimating GRIN lens at location offset from the optical axis of the lens.

Referring now to FIG. 2, an input beam 20 is shown entering a left end face of a GRIN lens 10b substantially offset from the optical axis OA of the lens. Due to this shift, or offset, the beam 22 at the output end of the lens exits at an angle θ and is non-parallel to the OA of the lens.

Figure 3:
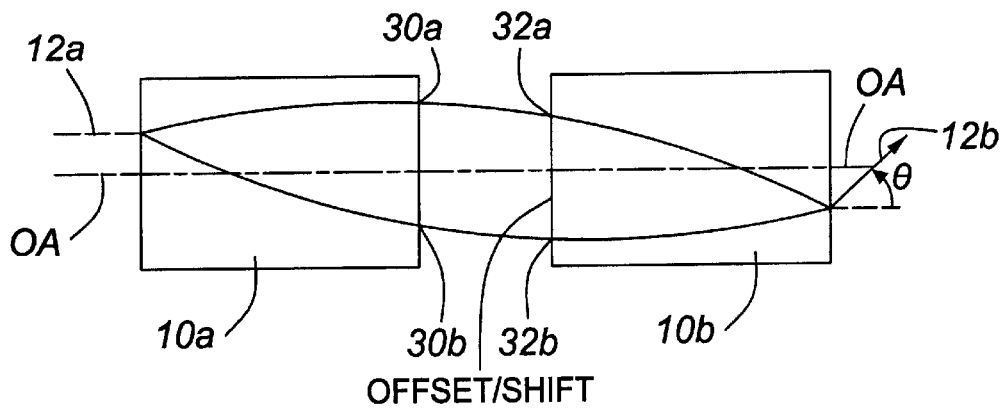
FIG. 3 is a block diagram of a coupling system in accordance with the invention, wherein losses are reduced by angling a receiving output fibre with respect to the angle of the input fibre.

FIG. 3 illustrates a shift or offset that occurs when a large gap is present between a pair of coaxial GRIN lenses 10a and 10b. The beam exiting the lens 10a intersects the end face equidistant from the optical axis indicated by 30a and 30b which define the outer most limits of the beam as it traverses the lens 10a end face. However, due to the large gap between the lenses 10a and 10b, the beam traverses the inwardly facing end face of the lens 10b having its outermost limits defined by the location 32a and 32b which are not equidistant from the optical axis OA of the second lens 10b. It is this beam shift downward that results in the output beam being directed upward along the optical axis of the optical fibre 12b. Hence, in accordance with this invention, the fibre 12b is provided at an angle θ>0 degrees with respect to the optical axis of the lens 10b. In this manner, more efficient optical coupling is provided.

Figure 4:
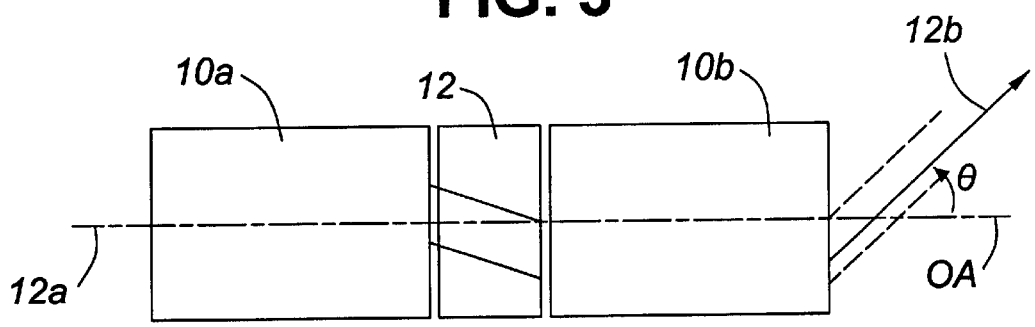

FIG. 4 illustrates an optical filter arrangement in accordance with an aspect of the invention wherein an input optical fibre 12a is disposed coaxially with and along the optical axis of a GRIN lens 10a. A thick filter element 12 is shown sandwiched between the first GRIN lens 10a and a second GRIN lens 10b. The filter element 12 is shown to shift the beam exiting the first GRIN lens 10a. Upon entering the second GRIN lens 10b, the beam propagates through the lens and exits at an angle θ. In order to more efficiently couple the optical energy from the beam, an optical fibre is disposed at a port on the outwardly facing end face of the lens 10b and at an angle θ with respect to the optical axis of the GRIN lens 10b. It should be noted, that as the substantially collimated beam entering the second GRIN lens becomes more offset from the OA of the lens, the angle at which the beam exits the output port of the lens 10b becomes steeper, and this the output fibre must be more angled with respect to the OA of the lens.

Figure 5:
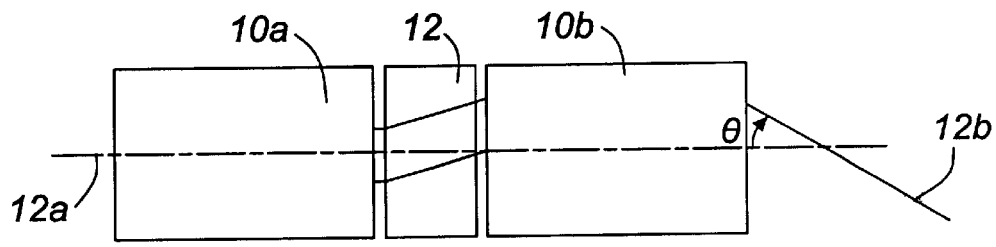
FIG. 5 is a block diagram of an optical filter arrangement wherein an upward shift of the beam traversing the gap between two GRIN lenses causes a downward shift in the output beam exiting the output end face of the GRIN lens.

FIG. 5 illustrates an optical filter arrangement wherein an upward shift of the beam traversing the gap between two GRIN lenses causes a downward shift in the output beam exiting the output end face of the GRIN lens 10b. Light is efficiently coupled into the output fibre 12b, which is angled downward as is the beam which exits the end face of the lens.

Figure 6:
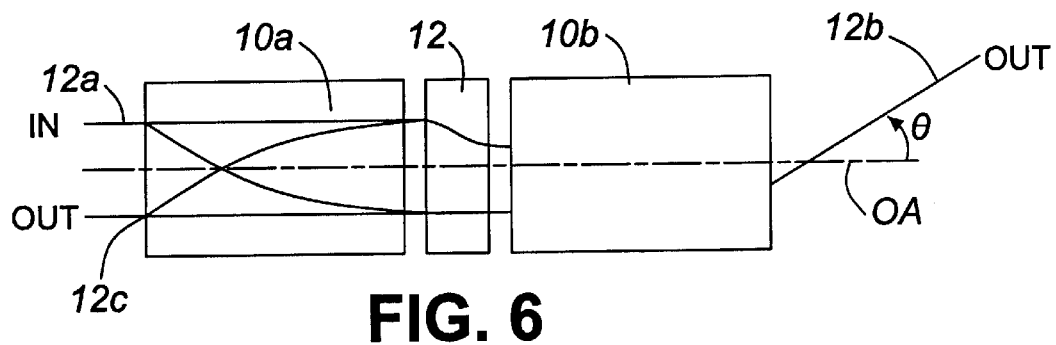
FIG. 6 is a block diagram of an embodiment of the invention wherein a three-port device is provided.

FIG. 6 shows an embodiment of the invention wherein a three-port device is provided. Light launched via the input fibre. 12a is either passed through the filter 12 to be received by the fibre 12b or is reflected to the receiving fibre 12c. The output fibre 12b is angled by θ degrees so as to more efficiently capture the light incident thereon.

Figure 7:
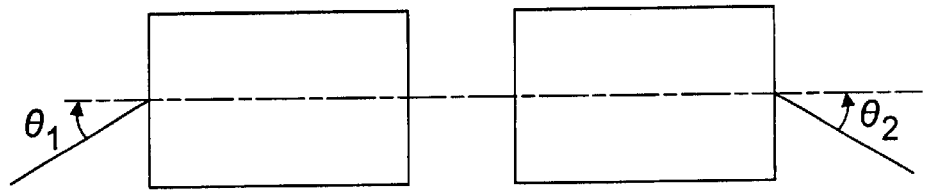
FIG. 7 is a block diagram of an embodiment of the invention wherein both the input and output optical fibres are angled by angles θ1 and θ2 respectively.
Figure 8:
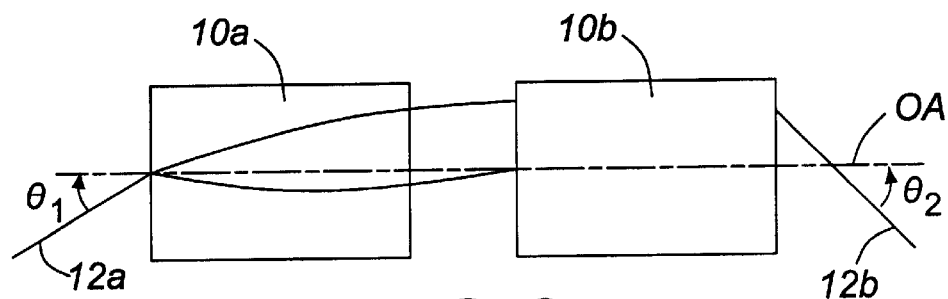
FIG. 8 is a block diagram of an embodiment of the invention wherein both the input and output optical fibres are angled by angles θ1 and θ2 respectively and, FIG. 9 is a block diagram of a similar embodiment to FIG. 7, wherein the input and output optical fibres are located off the optical axis of the lens.
Figure 9:
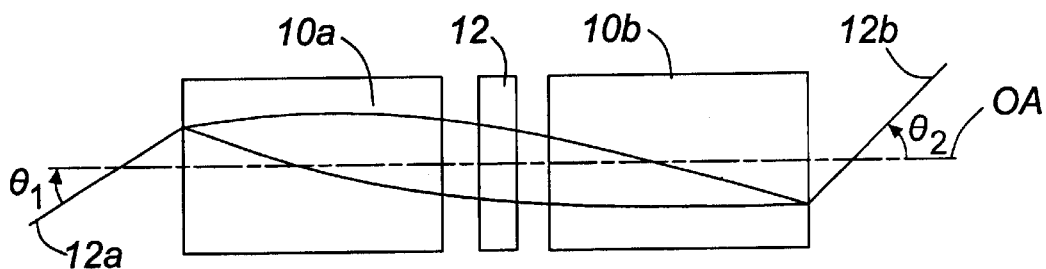

FIGS. 7, 8, and 9 illustrates embodiments of the invention wherein both the input and output fibres are angled by angles θ1 and θ2 respectively, wherein θ1=θ2 and in another instance wherein θ1≠θ2.

A commonly used fibre tube or ferrules housing the fibre can be polished to achieve the required angles for efficiently coupling light.

Although the facet or end face of the lens is shown as being perpendicular to the optical axis of the lens in the drawings, this is not a requirement. In other embodiments not shown, the end face or facet may be angled, and the end facet or face of the optical fibre coupled thereto may have a complementary angled face to mate with the angled end facet of the lens.

In the aforementioned description, for ease of explanation the first lens has been denoted as the input lens, wherein the second lens has been denoted as the output lens. Of course the device is not restricted to use in this forward direction and can be used in an alternate manner wherein the second lens functions as the input end, and the first lens as the output end. The required angle on the fibre 12b would however be necessary to achieve enhanced coupling.

In the background of the invention it is noted that significant advantages are afforded by using an arrangement in accordance with this invention wherein an optical fibre tube or sleeve having a slanted end face is coupled with an end face of a rod lens that is cut or polished to a quarter pitch or a desired pitch without a slant.

Figure 13:
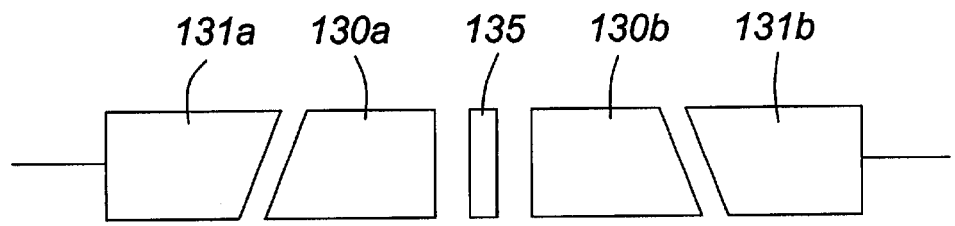

FIG. 13 depicts a conventional arrangement wherein a pair of substantially quarter pitch rod lenses 130a and 130b are arranged back-to-back having their outwardly facing end faces polished with a slant of approximately 6 degrees to lessen the unwanted effects of back reflections. Optical fibre tubes 131a and 131b each having a slanted end face are disposed adjacent the lenses 130a and 130b respectively. Longitudinal axes of the lenses and the tubes are coaxial. An optical filter 135 is disposed between the two GRIN lenses 130a and 130b. Although this well-known arrangement functions adequately, the cost of polishing both the end faces of the lens and the end faces of the optical fibre tubes is considerable. Furthermore, providing, for example an exactly quarter pitch lens that provides perfect or near perfect collimation or focusing, is far less complex if the lens end face is orthogonal to its longitudinal axis.

Figure 10:
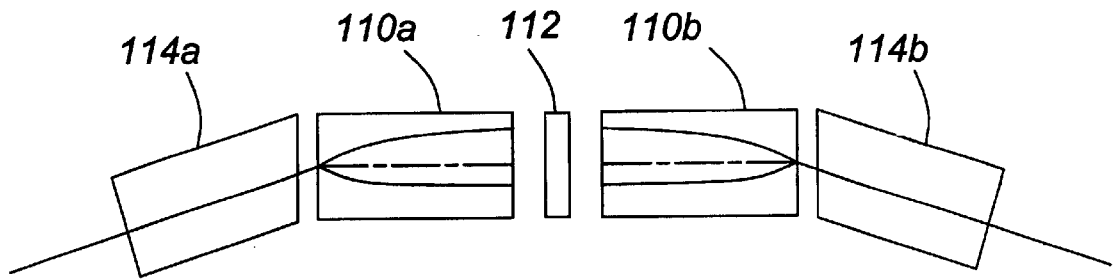
FIG. 10 is a diagram of an alternative embodiment of the invention wherein GRIN lenses have perpendicular end faces and wherein optical fibre tubes coupled thereto, have slanted end faces.
Figure 11:
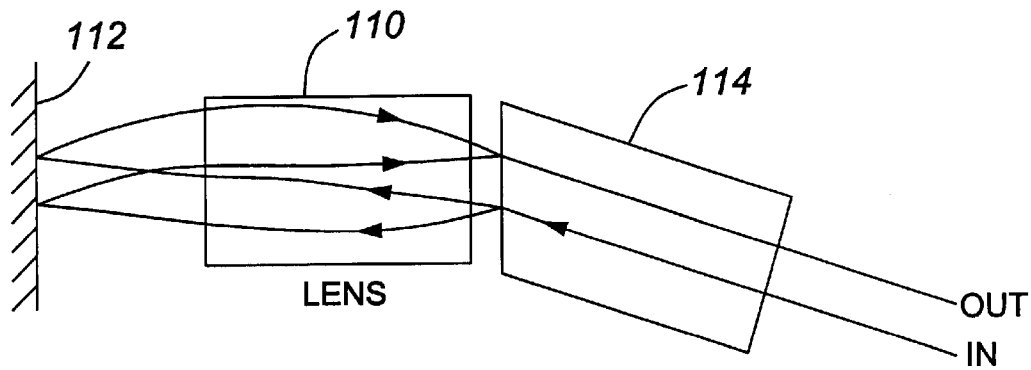
FIG. 11 is a diagram of an alternative embodiment of the invention wherein an optical filter is shown having only a single GRIN lens with perpendicular parallel end faces and an optical fibre tube with a slanted end face coupled thereto.

FIGS. 10 and 11 show known optical components arranged in accordance with this invention that allow collimation of an input beam of light exiting an optical fibre, filtering of the collimated beam, and focusing of the filtered light into another optical fibre at another or a same end; both of these embodiments do not require polishing of an end of the GRIN lens or lenses to achieve a slanted end face. Only the adjacent optical fibre sleeve or sleeves are required to have their end faces polished or cut to a slant of between 2 and 15 degrees.

Referring now to FIG. 10 a pair of standard commercially available GRIN lenses 110a and 110b are provided having a filter element such as a dichroic filter 112 disposed therebetween. Optical fibre sleeves 114a and 114b each have a slant of approximately 6 degrees at end faces facing the GRIN lenses 110a and 110b to provide optimum coupling and the required walk-off angle for back reflections. When light is launched into the GRIN lens 110a from the optical fibre within the sleeve 114a at an input angle of 6 degrees, the beam becomes collimated by the lens 110a, however the collimated beam is not concentric with the optical axis of the lens. The collimated beam passes through the filter and enters the lens 110b eccentrically, once again offset such that its axis is not concentric with the optical axis of the lens. Since the light enters the lens 110b in this manner it exits the lens 110b at an opposite end at an angle of 6 degrees form the normal. The slanted end sleeve 114b having an optical fibre with a similar slant of 6 degrees allows optimum coupling of the beam exiting at an angle.

FIG. 11 illustrates a reflective optical filter wherein an input optical fiber and an output optical fibre are disposed within the same sleeve 114. In this instance the optical fibre tube 114 having a slanted end face is optically coupled with a standard GRIN lens 110 absent a slanted end face. A filter element 112 is shown disposed a distance from the lens 110.

Figure 12:
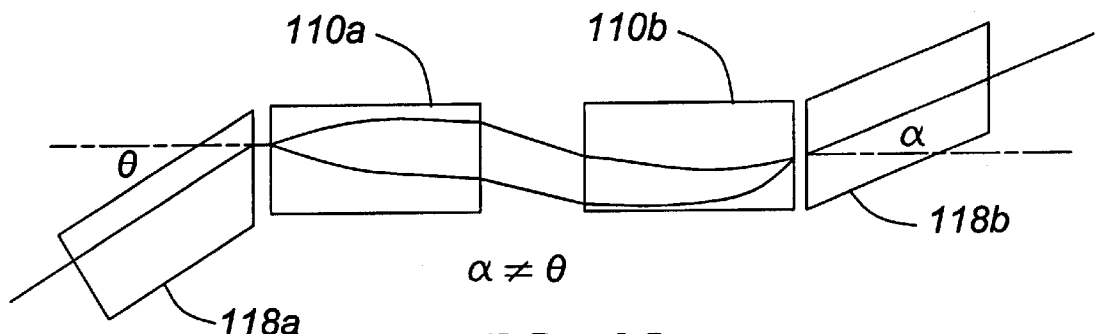
FIG. 12 is a diagram of an alternative embodiment of the invention, wherein slanted end faces of optical fibre tubes are disposed adjacent non-slanted end faces of GRIN lenses, the axes of the optical fibre tubes being non-parallel to correct for an unwanted shifting of a beam propagating therethrough due to a large gap between the lenses; and, FIG. 13 is a diagram of a conventional filter arrangement wherein two lenses having slanted end faces, and two optical fibre tubes having slanted end faces have coaxial axes, and wherein a filter element is disposed therebetween.

The embodiment shown in FIG. 12 illustrates another example wherein the use of two optical fibre tubes 118a and 118b having fibers therein and having slanted end faces adjacent standard GRIN lenses absent slanted end faces, is advantageous. A first advantage is afforded by not polishing the lenses to have a slant as described in the previous examples; however another more subtle advantage is afforded; when pair of collimating/focusing lenses are used having a thick optical element disposed therebetween (not shown in FIG. 12) the beam exiting one of the lenses destined for the other is shifted across the gap between the end faces of the lenses as is shown here. The larger the gap, the more eccentric the beam will be with respect to the optical axis of the GRIN lens it is destined for; and as described heretofore, when a collimated beam is launched shifted from the optical axis of a GRIN lens, it exits from an opposite end of the lens at an angle. The angles θ and α denote different angles; however the required polish on the end faces of the lenses to achieve optimum coupling depends upon the gap distance between the lenses.

Numerous other embodiments may be envisaged without departing from the spirit and scope of the invention. For example, in the arrangement shown in FIG. 10 the filter can be disposed at an angle rather than disposed parallel to the inward faces of the GRIN lenses 110a and 110b. By providing an arrangement wherein the filter is tilted, tuning can be performed by rotating the filter about its central axis which is coincident with the optical axis of the lenses.

What is claimed is:

1. An optical coupling system comprising:

a first substantially focusing/collimating rod lens having substantially parallel end faces orthogonal to a longitudinal axis;

a second substantially collimating/focusing rod lens having substantially parallel end faces orthogonal to a longitudinal axis;

an optical element disposed between the two rod lenses; and a first optical fibre tube including an optical fibre therein adjacent to and optically coupled with at least one of the rod lenses, the optical fibre having a longitudinal axis which is non-parallel to the longitudinal axis of a rod lens adjacent thereto;

wherein a line extending along the longitudinal axis of the first optical fibre intersects a line extending along a line extending along the longitudinal axis of the adjacent rod lens at a non-zero angle.

2. An optical coupling system as defined in claim 1, comprising a second optical fibre tube including an optical fibre therein optically coupled with the other of the rod lenses.

3. An optical coupling system as defined in claim 2, wherein a longitudinal axis of one of the optical fibre tubes is parallel to a longitudinal axis of one of the rod lenses.

4. An optical coupling system as defined in claim 1, including an optical filter disposed between the rod lenses.

5. An optical coupling system as defined in claim 4, wherein the filter is tilted and non-parallel to inward facing end faces of the rod lenses.

6. An optical coupling system as defined in claim 2, wherein each of the first and second rod lenses is a GRIN lens.

7. An optical coupling system as defined in claim 6, wherein both of the optical fibre tubes have a slanted end face, which faces a corresponding end face on a different one of the GRIN lenses.

8. An optical coupling system as defined in claim 7, wherein the slanted end faces of the optical fibre tubes are at different slant angles to optimize the coupling of light between the fibres.

9. An optical coupling system as defined in claim 7, wherein the slanted end faces of the optical fibre tubes are at same slant angles to optimize the coupling of light between the fibers.

10. An optical coupling system comprising:
   a first substantially focusing/collimating rod lens having at least one end face that is substantially orthogonal to a longitudinal axis of the rod lens; and
   an optical fibre tube adjacent to the rod lens, the optical fibre tube having a longitudinal axis which is non-parallel to the longitudinal axis of a rod lens;
   wherein a line extending along the longitudinal axis of the optical fibre tube intersects a line extending along a line extending along the longitudinal axis of the adjacent rod lens at a non-zero angle.

11. An optical coupling system as defined in claim 10, wherein the rod lens has two parallel end faces, each orthogonal to the longitudinal axis of the lens.

12. An optical coupling system as defined in claim 10, wherein the optical fibre tube includes an optical fibre therein that is optically coupled with the rod lens and non-parallel to the longitudinal axis of the rod lens.

13. An optical coupling system as defined in claim 12, wherein the optical fibre tube includes two optical fibres therein, optically coupled with the rod lens.

14. An optical coupling system as defined in claim 12, wherein an end face of the optical fibre tube and an end face of the optical fibre therein are slanted.

* * * * *